Feb. 8, 1966     B. T. STEPHENS ET AL     3,234,038
RESINOUS COMPOSITIONS EMPLOYING NON-LEAFING ALUMIMUM FLAKE
Filed Feb. 14, 1962     2 Sheets-Sheet 1

INVENTORS
FRANK P. BAKOS and
BYRON T. STEPHENS
BY
Oscar L. Spencer
ATTORNEY 3,234,038
RESINOUS COMPOSITIONS EMPLOYING NON-LEAFING ALUMINUM FLAKE
Byron T. Stephens, Dearborn, and Frank P. Bakos, Detroit, Mich., assignors to Pittsburgh Plate Glass Company, Pittsburgh, Pa., a corporation of Pennsylvania
Filed Feb. 14, 1962, Ser. No. 173,297
11 Claims. (Cl. 117—71)

This invention relates to a coruscating coating system for use as an automotive finish or to provide other objects with a highly reflective coating. More particularly, this invention relates to a coating system comprising at least one layer of a resinous vehicle and coarse, highly polished aluminum flakes.

The invention further relates to an article of manufacture comprising a metal surface with said coating system superimposed thereon.

The invention still further relates to a coating composition comprising a resinous vehicle, relatively coarse, highly polished aluminum flakes and a tinting pigment or pigments.

The use of metal flakes, particularly aluminum flakes, as a constituent in automotive finishes to provide a metallic appearance has become widespread. These compositions are sometimes known as "polychromatic" finishes. Because of their pleasing appearance their use has increased to a point that they are considered to be one of the standard automotive finishes. One of the reasons that they have been accepted so readily as automotive finishes is the fact that surfaces coated with these finishes give the illusion of accentuated curvature because reflectance and/or color significantly changes with the viewing angle. This phenomenon is commonly termed by those skilled in the art as being the "flop of the finish." "Flop" may be defined as the degree of change in reflectance of the amount and average wave length of light with the change of the viewing angle.

In recent years there has been a great increase in the demand for specialty type automotive finishes, particularly by those interested in publicity, display or show models and also by those interested in advertsing and promotion work. An extension of these metallic finishes is found in what is termed the "flamboyant" finishes, which are multiple top coats of tinted transparent resins superimposed on an opaque aluminum pigmented first coat. The depth of the multiple top coats enhances the brillance and supplies the ostentation desired by those interested in specialty type work.

The "flamboyant" finishes, however, must ordinarily be marketed as a two-package system and are difficult to apply since the color varies with the film thickness. Moreover, the tints, being present in very low concentrations, are often fugitive and tend to bleach out.

Another specialty finish which is being used by the sports car and "hot rod" hobbyists are the compositions which contain a tinted or untinted plastic coated aluminum particle of more or less constant size which has been cut from the plastic coated sheet aluminum. Such coatings are extremely ostentatious and supply the desired effect for those interested in specialty type coatings. These coatings are, however, very expensive and require an overly thick top coat layer in order to supply sufficient depth to cover all of the isolated metal particles which may make for poor durability, slow air drying and high application costs.

While aluminum flake has been extensively used in automotive finishes, the flake has not effectively been utilized to provide the striking reflectance characteristics of the specialty type finishes. The main reason for this probably stems from the fact that these aluminum flake containing compositions uniformly are formulated with the intention that they should be finish top coats. Such compositions require that the coloring matter and aluminum flake be present in a single composition which must also provide acceptable gloss. Also the colorant or tint necessarily partially masks the aluminum flakes which are beneath the surface, which masking becomes greater with the thickness of the coating. Moreover, in order to obtain finish gloss the particle size and concentration of the aluminum flake are limited. The result of this approach has been to produce coatings with a good degree of "flop" (accentuated curvature) but without a sparkling, commanding appearance which is necessary for the ostentatious specialty type finishes.

It has now been discovered that a coating system having the desired reflectance characteristics for use as a specialty type finish, yet without sacrificing the required protective properties, may be made by employing large particle size (200 to 60 mesh; wherever utilized herein and in the appended claims, mesh sizes are those determined according to Method D–480–51 of the American Society of Testing Materials) highly polished non-leafing aluminum flake in a tinted first coat and providing a superimposed clear top coat. The thickness of the overall coating system is not significantly greater than that of most standard automobile coating systems. The fact that the coating system can be made so, applied and still produce the desired reflectance characteristics is entirely unexpected, especially in view of the large particle size of the aluminum flake.

In addition to not having the deficiencies as coatings which are found in the "flamboyant" type finishes or the plastic coated flake containing finishes, the coatings of the instant invention are more versatile.

The aluminum particles utilized in the practice of the invention need not be colored, but are mixed with a resinous vehicle of any type which may or may not be tinted. It is readily seen that by tinting the vehicle an unlimited range of colors is available and that the said coatings may or may not be covered with a top coat of a clear film. The fact that the top coat may be clear makes it obvious that color will not be a variable in the film itself, whereas in the "flamboyant" finishes the top coats are tinted and color is therefore a variable. Moreover, resinous compositions containing these aluminum flakes may be marketed as a one-package system which maintains the aluminum flakes in a suspension which is equivalent to a standard flake suspension. Clear resinous compositions for top coats are easily obtainable commercially.

The invention is carried out simply by incorporating at least 4 percent by weight of the aluminum flake based on the total solids into any resinous vehicle. This vehicle may be comprised of an acrylic resin (thermoplastic resin), amino-formaldehyde resins such as melamine-formaldehyde or urea-formaldehyde resins, the various alkyd resins, nitrocellulose, polyamides, and various blends of resins such as melamine alkyds, phenolic alkyds, epoxy melamines, and the like. The aluminum particle containing resinous material is then tinted if desired with one or more of a large variety of pigments which may be organic or inorganic. The only factor in choosing a tinting pigment is that it should not opacify the resinous vehicle. The tinted resinous composition containing the aluminum flake is then adjusted to a suitable viscosity and applied to the desired surface by any one of the commonly used methods such as spraying, roll coating, electrostatic application, or even brushing. In order to obtain maximum "effect" from the coating, it should be applied in thicknesses adequate to hide the substrate. The optimum film thickness varies with each different tinting pigment because of the variance in tinting strength and transparency of the said tinting pigments. Further applications of the top coat and the baking or curing depend, of course, upon the type of resinous vehicle which is employed and upon the gloss or appearance desired for the film.

The preferred coating system of the instant invention may be described as a first layer of a tinted or untinted resin having the relatively coarse, highly polished aluminum flakes dispersed therein with a certain proportion of the said aluminum flakes protruding through the surface of the said layer and into a superimposed layer of a clear resinous material. The fact that a certain proportion of the aluminum flakes protrude into the clear surface layer enhances the coruscating effect of the coating system. This inhanced effect is probably due to a broader spectrum of diffracted light which is not filtered out by the tinting pigment of the first layer. Moreover, the aluminum flakes which protrude above the first layer being the least laminar and parallel to the plane of the coating tend to diffuse the light and give a sparkling effect when an article coated with the said system is viewed at an angle substantially different from the angle of spectral reflectance. The clear layer is preferably from about 1½ to 2 mils thick; however, the only criteria to be used in determining the thickness of this layer rests in providing a surface where none of the aluminum flakes protrude. In many instances thickneses of about 1 mil have been adequate. However, it is readily understood that there is in reality no maximum thickness on the clear second layer from a standpoint of reflectance characteristics, and as long as the desired physical and protective properties are acquired, any thickness can be utilized.

The aluminum flake particles which may be used with the instant invention must be prepared by a method which provides polished non-leafing aluminum flake. Such methods are well known to those skilled in the art.

The aluminum flake which is employed in the preparation of the coating systems of the instant invention is prepared in several ways. The most common means of obtaining aluminum flake is to atomize molten aluminum and subsequently grind it or hammer it in the presence of various lubricants. If the lubricant is a long chain saturated fatty acid the prepared flake is not easily wetted by the resinous vehicle and tends to float to the surface subsequent to application, giving a more or less continuous layer of aluminum flakes. This phenomenon is called leafing. In many instances, especially when utilized in automotive finishes, it is undesirable to have this effect. It is therefore desirable to remove the long chain fatty acid or to grind or hammer the atomized aluminum in the presence of other materials such as for example the short chain fatty acids. The flakes thus produced are more easily wetted by the resinous vechiles and tend to become randomly dispersed rather than to float and are therefore less likely to layer at the surface during the curing or drying of the resinous vehicle.

The aluminum flake is then subjected to various treatments which impart a gloss or polish thereto. These polished aluminum flakes may then be utilized with various resins to produce coating compositions for decorative effects, particularly in the areas of automotive finishes. As previously mentioned, compositions of the instant invention must be prepared utilizing relatively coarse aluminum flake which is considered to be non-leafing and which is highly polished by any one of a variety of methods used by the producers of aluminum flake. These aluminum flake particles are plate-like in appearance, but have a ragged edge which follows no geometrical design which may be observed as being peculiar to the flakes in general. The flatness or platelike appearance of the flake is partially determined by the method by which the flakes were prepared. The hammered flakes tend to be more flat than the ball milled; however, both may be used with equally good results, the important quality being the particle size and reflective properties. For a more complete description of polished non-leafing aluminum flake and the methods of preparation, reference is made to Organic Coating Technology, Payne, vol. II, 1961.

The particle size of the flake should be predominantly between 100 mesh and 200 mesh. However, substantial amounts may be above 100 mesh and up to 60 mesh. A predominant number and preferably about 80 percent of the particles should be between 200 and 60 mesh. Excellent compositions may be made using flake having as much as 15 percent −325 mesh which aids suspension.

It is quite significant that at least the predominant amount of the aluminum flakes have a particle size in the range of from 200 to 60 mesh. As a substantial number of the particles approach a smaller size (−325 mesh) there are an insufficient number of large planer surfaces provided in the coating to produce the sparkling effect. When the proportion of the relatively coarse aluminum flake is present in minor amounts, the resolving power of the human eye can only detect the sparkling at very short distances and the value of the coating for show or display work is significantly reduced. Particle sizes larger than 60 mesh cannot be used because of application problems etc.

The aluminum flake particles are employed in amounts of at least about 4 percent by weight of the total solids of the composition. It is preferred, however, that from about 20 percent to about 25 percent of the flake be used. There is really no maximum limit on the amount which may be employed except that as the aluminum particle to resinous vehicle ratio increases, compositions containing an abnormal amount of aluminum flake particles tend to become underbound and are not effective as protective coatings; and film properties such as humidity resistance, impact resistance and the like may be lowered.

If desired a tinting pigment may be added to the flake containing composition. Examples of such pigments which may preferably be used include phthalocyanine green, phthalocyanine blue, indanthrene yellow, burnt sienna, indo orange, phthalocyanine blue green tone, carbon black, phthalocyanine blue red shade, quinacridone red and hydrated iron oxide.

There are many areas other than automotive finishes where reflecting surfaces are utilized. The coating compositions of the instant invention may also be advantageously employed as reflector surfaces and on other devices which may be used for the purposes of warning or signalling. Moreover, the coatings of the instant invention may serve as decorative surfaces for business machines, appliances, paneling or wall board for interior decoration or on table tops and the like.

When reflecting properties alone are desired and a nonglossy surface is required, the compositons of the instant invention may be employed without the need for any clear top coats. Of course, if specular reflectance is desirable a glossy top coat should be employed.

Because of the great diversity in the kinds of resinous systems which may be used to form the aluminum flake containing compositions of the instant invention, the said compositions may be employed on a large variety of substrates, including metal, wood, plastic sheet, glass, and the like. However, in many instances it is desirable to first coat the substrate with a primer composition. This is particularly true when the coating systems of the instant invention are to be employed as automotive finishes where excellent durability is demanded because of the extremes in environmental conditions. All of the well known primers may be included advantageously as substrates for the coating systems of the instant invention. Examples of these primers include those employed in the various resins and resinous blends as follows: Drying oil-modified alkyds, resin-modified alkyds, mixed or co-reacted alkyds and epoxy resins, mixed or interreacted alkyd, amino-formaldehyde, epoxy resins, mixed or interreacted esterified epoxy resins with amino-formaldehyde resins and/or alkyds.

The application and use of the various metal primers especially for automotive finishes are well known to those skilled in the art.

The reflecting effects of surfaces prepared from compositions of the instant invention as compared with the reflecting effects of surfaces of a standard polychromatic automotive finish are graphically depicted in the accompanying drawings.

Figure 1:
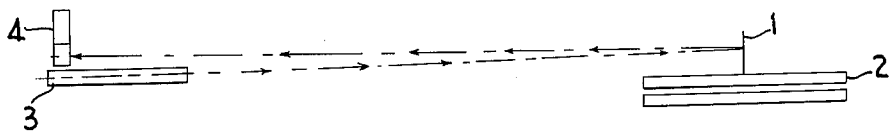
FIGURE 1 represents the light reflecting apparatus used to measure the reflecting effects of the said surfaces.

Using the apparatus of FIGURE 1, reflecting surfaces of the instant invention and the standard polychromatic finishes were measured as follows: Panel 1, containing a reflecting surface to be tested, was vertically affixed on turntable 2, light source 3 was then placed in a position away from said turntable so that light emitted therefrom would be on a plane perpendicular to the face of the reflecting surface of the said panel 1. Light source 3 was then adjusted so that it cast a beam at a slight angle from the perpendicular (1° or less) whereby reflected light from the panel was reflected back immediately above said light source. Light meter 4 was then placed in a position immediately above light source 3 and fully in position to receive the reflected light. The turntable was then rotated a full 90° with readings of the light meter being taken after each rotation of 10°.

Figure 2:
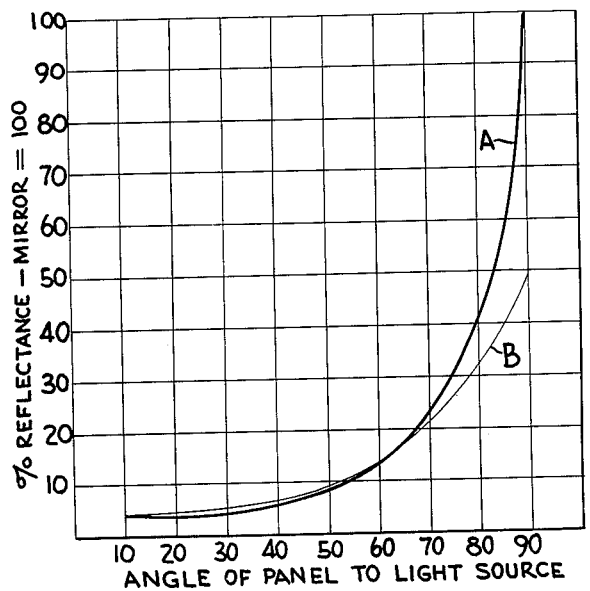
FIGURE 2 is a graph plotted on cartesian coordinates, the percent reflectance versus the angle of the reflecting surface to a light source.

The graph of FIGURE 2 shows two curves illustrating the degrees in the amount of light reflected with each 10° of rotation away from the 90°. One hundred percent reflectance was arbitrarily taken to be the maximum amount of light reflected at any surface at any angle.

Curve A represents the light reflected from surfaces prepared from the compositions of the instant invention, while Curve B represents the light reflected from a standard polychromatic finish. It should be noted that the surfaces prepared from the compositions of the instant invention reflect more than twice as much light at 90° and 80° than do the surfaces prepared from "polychromatic" type compositions; while there is very little difference with the amount of light at angles of 70° or less. The fact that the surfaces prepared from the compositions of the instant invention reflect twice as much light as the polychromatic surfaces when the viewing angle is substantially perpendicular (90°) and the light source is substantially perpendicular to the said surfaces is indicative of a much sharper contrast in appearance with the viewing angle which accentuates the curvature of an object to a much higher degree. Moreover, it is obvious that since the surfaces of the instant invention reflect twice as much light as those of the standard polychromatic finishes, objects containing the said coatings would be more easily noticed.

Figure 3:
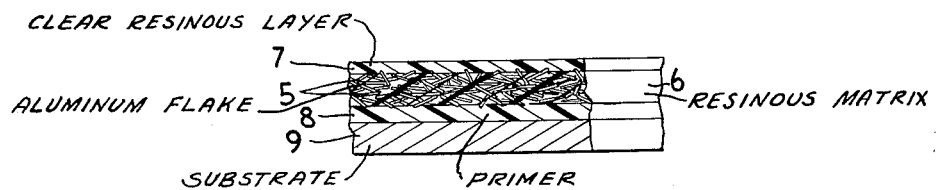
FIGURE 3 represents a cross section of the coating systems of the instant invention as an article of manufacture showing the system with a primer on a metal surface.
Figure 4:
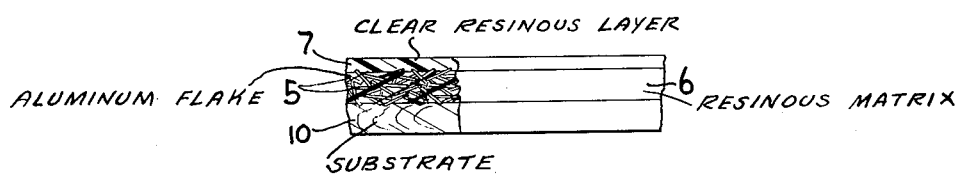
FIGURE 4 shows the same cross section superimposed directly on an unprimed substrate.

FIGURES 3 and 4 show aluminum flake 5 in random positions bound within the resinous matrix of layer 6 and clear resinous layer 7 is shown to be superimposed on layer 6 with some of the aluminum flakes protruding into the said layer 7. The substrate in FIGURE 3 is shown as baking primer 8 superimposed on metal substrate 9 with resinous layer 6 superimposed theron. In FIGURE 4, substrate 10 represents any substrate which may be employed as a support for the reflecting coating system of the instant invention such as wood, plastic and the like.

The following examples are given by way of illustration and not by way of limitation. All parts and percentages are by weight unless otherwise specified.

Each of the compositions described in the following examples was mixed until homogeneous and adjusted to a suitable spraying viscosity. They were then sprayed on phosphatized steel panels (Bonderite 100) to a thickness of between 4.5 and 5 mls.

*Example I*

This example relates to a composition of a silver acrylic reflective coating.

|  | Parts by weight |
|---|---|
| Highly polished non-leafing aluminum flake 100 to 200 mesh (MD 1500, Metals Disintegrating Co.) | 620 |
| Aluminum paste MD 587 or Reynolds 19LN, −325 mesh (70% pigment) | 143 |
| Copolymer of 90 percent methyl methacrylate and 10 percent lauryl methacrylate (38% solution in toulene) | 5170 |
| Butyl benzyl phthalate | 610 |
| Cellosolve acetate | 550 |
| Toluol | 1270 |

After the above composition was sprayed on the phosphatized steel panels and baked within a temperature range of 180° F. to about 225° F. the following clear composition was applied as a top coat to the said coating.

|  | Parts by weight |
|---|---|
| Copolymer of 90 percent methyl methacrylate and 10 percent lauryl methacrylate (38% solution in toluene) | 5386 |
| Butyl benzyl phthalate | 634 |
| Cellosolve acetate | 582 |
| Toluol | 1323 |

*Example II*

|  | Parts by weight |
|---|---|
| Highly polished non-leafing aluminum flake 100 to 200 mesh (MD 1500) | 514 |
| Aluminum paste, 325 mesh (70% pigment) | 119 |
| ½ second nitrocellulose (32% solution in 50:50 methyl ethyl ketone-toluol) | 1242 |
| ¼ second nitrocellulose (40% solution in 50:50 methyl ethyl ketone-toluol) | 1599 |
| 41% coconut oil glycerol phthalate alkyd (50% solids in toluol) | 1528 |
| Dibutyl phthalate | 97 |
| Blown cator oil | 244 |
| Isopropanol | 453 |
| Normal butanol | 87 |
| Isobutyl acetate | 1011 |
| Xylol | 217 |
| Toluol | 1095 |

After the above composition was sprayed on the phosphatized steel panels and baked within a temperature range of 180° F. to about 225° F. the following clear composition was applied as a top coat to the said coating.

|  | Parts by weight |
|---|---|
| ½ second nitrocellulose (32% solution in 50:50 methyl ethyl ketone-toluol) | 1290 |
| ¼ second nitrocellulose (40% solution in 50:50 methyl ethyl ketone-toluol) | 1650 |
| 41% coconut oil glycerol phthalate alkyl (50% solids in toluol) | 1580 |
| Dibutyl phthalate | 100 |
| Blown castor oil | 250 |
| Isopropanol | 470 |
| Normal butanol | 90 |
| Isobutyl acetate | 1050 |
| Xylol | 220 |
| Toluol | 1130 |

The above example relates to a silver nitrocellulose lacquer reflective coating.

Example III

The following example relates to an air dry alkyd reflective coating.

| | Parts by weight |
|---|---|
| Highly polished non-leafing aluminum flake 100 to 200 mesh (MD 1500) | 637 |
| Aluminum paste, 325 mesh (70% solids) | 147 |
| 46% linseed oil glycerol phthalate alkyd (50% in 50:50 xylol-Hi-Flash naphtha) | 5242 |
| 6% cobalt naphthenate | 22 |
| 6% manganese naphthenate | 10 |
| 16% lead naphthenate | 143 |
| Anti-skining agent | 11 |
| Kerosene | 888 |
| Oleum spirits | 270 |
| Xylol | 723 |

After the above composition was sprayed on the phosphatized steel panels and baked within a temperature range of 180° F. to about 225° F. the following clear composition was applied as a top coat to the said coating.

| | Parts by weight |
|---|---|
| 4% linseed oil glycerol phthalate alkyl (50% in 50:50 xylol-Hi-Flash naphtha) | 5479 |
| 6% cobalt naphthenate | 23 |
| 6% manganese naphthenate | 15 |
| 16% lead naphthenate | 149 |
| Anti-skinning agent | 11 |
| Kerosene | 926 |
| Oleum spirits | 281 |
| Xylol | 756 |

Example IV

The following example relates to an alkyd melamine-formaldehyde reflective coating.

| | Parts by weight |
|---|---|
| Highly polished non-leafing aluminum flake 100 to 200 mesh (MD 1500) | 712 |
| Aluminum paste 325 mesh (70% solids) | 164 |
| 38% coconut oil TME phthalate alkyd (65% total solids in xylol) | 3258 |
| Melamine-formaldehyde resin (50% solids in butanol-xylene) | 1554 |
| Normal butanol | 406 |
| Methylethyl ketone | 269 |
| Hi-flash naphtha | 1493 |

After the above composition was sprayed on the phosphatized steel panels and baked within a temperature range of 275° F. to about 350° F. the following clear composition was applied as a top coat to the said coating. After spraying the clear top coat, the panel was again baked at a temperature of 175° F. to about 350° F.

| | Parts by weight |
|---|---|
| 38% coconut oil TME phthalate alkyd 55% in xylol | 3740 |
| Melamine-formaldehyde resin (65% in butanol-xylol) | 1782 |
| Normal butanol | 465 |
| Methylethyl ketone | 309 |
| Hi-flash naphtha | 1715 |

Although specific examples of the invention have been set forth hereinabove, it is not intended that the invention be limited solely thereto, but to include all of the variations and modifications falling within the scope of the appended claims.

We claim:

1. An article of manufacture having a substrate and a multi-layer coating composition adherent thereto, one layer comprising a coating composition containing from about 4 percent to about 30 percent of a highly polished, non-leafing aluminum flake based on the total weight of resinous vehicle and flake, said flake having at least a predominant number of the particles of a size in the range of 200 mesh to 60 mesh, said layer having superimposed thereover as a topcoat a film of a clear, transparent coating composition, at least some of the aluminum flakes extending into said topcoat.

2. The article of claim 1 wherein the first layer comprises an acrylic resin.

3. The article of claim 1 wherein the first layer comprises an epoxy resin.

4. The article of claim 1 wherein the first layer comprises an alkyd resin.

5. The article of claim 1 wherein the first layer comprises a nitrocellulose resin.

6. The article of claim 1 wherein the first layer comprises a melamine-formaldehyde resin.

7. As an article of manufacture, a baking primer in firm adherent contact with a metal surface and having superimposed on said primer a coating system comprising a composition of a coating system comprising a first layer of a solid resinous vehicle containing from about 4 to about 30 percent by weight of a highly polished non-leafing aluminum flake having at least a predominant number of the particles of a size in the range of 200 to 60 mesh based on the total weight of the resinous vehicle and the said flake, said layer having superimposed thereon another layer comprising a clear resinous material.

8. The article of claim 7 wherein the said first layer contains a tinting pigment.

9. The article of claim 8 wherein at least some of the aluminum flakes extend into said second layer.

10. A resinous composition comprising a vehicle containing from about 4 to about 30 percent by weight of a highly polished non-leafing aluminum flake having at least a predominant number of the particles of a size in the range of 200 to 60 mesh based on the total weight of the resinous vehicle and the said flake.

11. The resinous composition of claim 10 wherein there is included a tinting pigment.

References Cited by the Examiner

UNITED STATES PATENTS

| 1,521,055 | 12/1924 | Tesse. | |
| 2,330,365 | 9/1943 | Jackson | 117—75 |
| 2,366,850 | 1/1945 | Gardner | 117—131 |
| 2,767,105 | 10/1956 | Fletcher | 117—71 |
| 2,875,087 | 2/1959 | Crandon | 117—31 |
| 2,878,141 | 3/1959 | Canniff | 117—71 |
| 2,881,091 | 4/1959 | Schulze | 117—71 |
| 2,941,894 | 6/1960 | McAdow | 106—290 |
| 2,997,776 | 8/1961 | Matter et al. | 117—132 |

OTHER REFERENCES

Edwards: "Aluminum Paint and Powder," publisher—Reinhold Publishing Corp., 1936, pp. 21, 62, 65, and 86.

"Chemical Engineers' Handbook," by Perry, publisher—McGraw-Hill, 1950, p. 963.

RICHARD D. NEVIUS, Primary Examiner.